(12) United States Patent
Stempel et al.

(10) Patent No.: US 8,185,725 B2
(45) Date of Patent: May 22, 2012

(54) SELECTIVE POWERING OF A BHT IN A PROCESSOR HAVING VARIABLE LENGTH INSTRUCTIONS

(75) Inventors: Brian Michael Stempel, Raleigh, NC (US); Rodney Wayne Smith, Raleigh, NC (US)

(73) Assignee: QUALCOMM Incorporated, San Diego, CA (US)

(*) Notice: Subject to any disclaimer, the term of this patent is extended or adjusted under 35 U.S.C. 154(b) by 132 days.

(21) Appl. No.: 12/612,860

(22) Filed: Nov. 5, 2009

(65) Prior Publication Data

US 2010/0058032 A1    Mar. 4, 2010

Related U.S. Application Data

(62) Division of application No. 11/536,743, filed on Sep. 29, 2006, now Pat. No. 7,716,460.

(51) Int. Cl.
*G06F 7/38* (2006.01)
*G06F 9/00* (2006.01)
*G06F 9/44* (2006.01)
*G06F 15/00* (2006.01)

(52) U.S. Cl. ............... 712/240; 712/229; 712/210

(58) Field of Classification Search ............ 712/240
See application file for complete search history.

(56) References Cited

U.S. PATENT DOCUMENTS

| | | | |
|---|---|---|---|
| 6,157,980 A | 12/2000 | Arimilli et al. | |
| 7,134,005 B2 | 11/2006 | Henry et al. | |
| 2005/0278517 A1 | 12/2005 | Wong et al. | |

FOREIGN PATENT DOCUMENTS

| | | |
|---|---|---|
| EP | 0372865 | 6/1990 |
| KR | 20050113499 | 12/2005 |
| WO | 2005011441 | 12/2005 |

OTHER PUBLICATIONS

International Search Report-PCT/US07/079864, International Search Authority-European Patent Office-Jan. 2, 2008.
Written Opinion-PCT/US07/079864, International Search Authority-European Patent Office-Jan. 2, 2008.
Breen et al; Aliasing and Anti-Aliasing in Branch History Table Prediciton; Dec. 2003; ACM SIGARCH Computer Architecture News, vol. 31, No. 5.
Kissell, MIPS16; High-Density MIPS for the Embedded Market; 1997; RTS '97.
Patel et al.; Reducing Cache Misses by Application-Specific Re-Configurable Indexing; 2004; IEEE.

*Primary Examiner* — Corey S Faherty
(74) *Attorney, Agent, or Firm* — Peter Michael Kamarchik; Nicholas J. Pauley; Jonathan T. Velasco

(57) ABSTRACT

In a processor executing instructions in at least a first instruction set execution mode having a first minimum instruction length and a second instruction set execution mode having a smaller, second minimum instruction length, line and counter index addresses are formed that access every counter in a branch history table (BHT), and reduce the number of index address bits that are multiplexed based on the current instruction set execution mode. In one embodiment, counters within a BHT line are arranged and indexed in such a manner that half of the BHT can be powered down for each access in one instruction set execution mode.

60 Claims, 4 Drawing Sheets

SELECTIVE POWERING OF A BHT IN A PROCESSOR HAVING VARIABLE LENGTH INSTRUCTIONS

CLAIM OF PRIORITY

The present application claims priority from and is a divisional of patent application Ser. No. 11/536,743 filed on Sep. 29, 2006 and entitled "Effective Use Of A BHT In Processor Having Variable Length Instruction Set Execution Modes," the contents of which are expressly incorporated herein by reference in their entirety.

BACKGROUND

The present invention relates generally to the field of processors and in particular to an effective organization for a branch history table in a processor having variable length instruction set execution modes.

Traditional instruction set architectures for processors have a uniform instruction length. That is, every instruction in the instruction set comprises the same number of bits (e.g., 16 or 32). Processors having variable length instruction set execution modes—wherein the processor may execute instructions having different bit lengths—are known in the art. For example, recent versions of the ARM architecture include 16-bit instructions that are executed in a 16-bit instruction set execution mode (Thumb mode) as well as the traditional 32-bit ARM instructions that are executed in a 32-bit instruction set execution mode (ARM mode).

One problem with processors executing variable length instructions is that instructions do not fall on uniform memory boundaries. Accordingly, circuits or operations that increment through, or randomly address, instructions (or ancillary constructs associated with instructions) cannot utilize a uniform incrementing or addressing scheme. Rather, they must alter the addressing scheme based on the length of instructions currently being executed, i.e., the current instruction set execution mode.

Most modern processors employ a pipelined architecture, where sequential instructions, each having multiple execution steps, are overlapped in execution. For maximum performance, the instructions should flow continuously through the pipeline. Any situation that causes instructions to stall in the pipeline detrimentally affects performance. If instructions must be flushed from the pipeline and subsequently re-fetched, both performance and power consumption suffer.

Virtually all real-world programs include conditional branch instructions, the actual branching behavior of which is not known until the instruction is evaluated deep in the pipeline. To avoid the stall that would result from waiting for actual evaluation of the branch instruction, most modern processors employ some form of branch prediction, whereby the branching behavior of conditional branch instructions is predicted early in the pipeline. Based on the predicted branch evaluation, the processor speculatively fetches and executes instructions from a predicted address—either the branch target address (if the branch is predicted taken) or the next sequential address after the branch instruction (if the branch is predicted not taken). When the actual branch behavior is determined, if the branch was mispredicted, the speculatively fetched instructions must be flushed from the pipeline, and new instructions fetched from the correct next address. Speculatively fetching instructions in response to an erroneous branch prediction adversely impacts processor performance and power consumption. Consequently, improving the accuracy of branch prediction is an important design goal.

Several methods of branch prediction are based on the branch evaluation history of the branch instruction being predicted and/or other branch instructions in the same code. Extensive analysis of actual code indicates that recent past branch evaluation patterns may be a good indicator of the evaluation of future branch instructions.

One known form of branch prediction utilizes a Branch History Table (BHT) to store an indication of recent branch evaluations. As one example, the BHT may comprise a plurality of saturation counters, the MSBs of which serve as bimodal branch predictors. For example, each counter may comprise a 2-bit counter that assumes one of four states, each assigned a weighted prediction value, such as:

11—Strongly predicted taken
10—Weakly predicted taken
01—Weakly predicted not taken
00—Strongly predicted not taken The counter increments each time a corresponding branch instruction evaluates "taken" and decrements each time the instruction evaluates "not taken." The MSB of the counter is a bimodal branch predictor; it will predict a branch to be either taken or not taken, regardless of the strength or weight of the underlying prediction. A saturation counter reduces the prediction error of an infrequent branch evaluation, as a single branch evaluation in one direction will not change the prediction of a counter that is saturated in the other direction.

In the case of a "local" BHT, each branch instruction, the branch evaluation of which is being predicted, is associated with a single BHT counter. Accordingly, the BHT is indexed with part of the branch instruction address (BIA). Many modern processors fetch a plurality of instructions in blocks or fetch groups, in a single fetch operation. In this case, the address associated with the block or fetch group is considered a BIA, as the term is used herein. In the case of a "global" BHT, recent global branch evaluation history may be concatenated with (gselect) or hashed with (gshare) the BIA prior to indexing the BHT counters.

Instruction sets having different instruction lengths complicate the design of BHTs. In particular, the BHT is ideally indexed differently in each different instruction set execution mode, since each counter is associated with a branch instruction, and the instructions fall on different memory boundaries in different instruction set execution modes. One known solution is to simply size the BHT based on the largest instruction length, but address it based on the smallest instruction length. This solution leaves large pieces of the table empty, or with duplicate entries associated with longer branch instructions. Another known solution is to multiplex the BHT index addresses, effectively using a different part of the instruction address in each different instruction set execution mode. This adds a large number of multiplexers, which increases silicon area and power consumption. More critically, however, it adds delay to a critical path, thus increasing the cycle time and adversely impacting processor performance.

SUMMARY

According to one or more embodiments, BHT line and counter index addresses are formed that access every counter in a BHT, and reduce the number of address bits that are multiplexed based on the current instruction set execution mode. Furthermore, in one embodiment, counters within a BHT line are arranged in such a manner that half of the BHT can be powered down for each access in one instruction set execution mode.

One embodiment relates to a method of forming an address to index every line in a BHT in a variable length instruction set processor executing instructions in at least a first instruction set execution mode having a first minimum instruction length and a second instruction set execution mode having a smaller, second minimum instruction length, whereby each instruction set execution mode logically indexes lines in the BHT using a different subset of address bits. The common BHT line index address bits of the first and second instruction set execution modes are identified. The most significant BHT line index address bits exclusive to the first instruction set execution mode and the least significant BHT line index address bits exclusive to the second instruction set execution mode are multiplexed based on an instruction set execution mode indicator. The common and multiplexed address bits are concatenated, and lines in the BHT are indexed using the concatenated address.

Another embodiment relates to a method of forming line and counter index addresses to access every counter in a BHT in a variable length instruction set processor executing instructions in at least a first instruction set execution mode having a first minimum instruction length and a second instruction set execution mode having a smaller, second minimum instruction length. Lines in the BHT are indexed using the line index address bits of the second instruction set execution mode. The most significant BHT line index address bit exclusive to the first instruction set execution mode and the least significant BHT counter index address bit exclusive to the second instruction set execution mode are multiplexed based on an instruction set execution mode indicator. Counters in each BHT line are indexing using all but the least significant counter index address bits of the second instruction set execution mode, concatenated with the multiplexed bit.

Yet another embodiment relates to a method of operating a BHT comprising a plurality of counters in a variable length instruction set processor executing instructions in at least a first instruction set execution mode having a first minimum instruction length and a second instruction set execution mode having a smaller, second minimum instruction length. The full BHT is powered during BHT accesses in the second instruction set execution mode. Only half of the BHT is powered during BHT accesses in the first instruction set execution mode.

Still another embodiment relates to a processor. The processor includes an instruction execution pipeline having a fetch stage and operative to execute instructions in at least a first instruction set execution mode having a first minimum instruction length and a second instruction set execution mode having a smaller, second minimum instruction length. The processor also includes a BHT comprising a plurality of counters arranged and indexed by instruction addresses in the fetch pipeline stage such that, in the first instruction set execution mode, only half of the BHT is powered.

DETAILED DESCRIPTION

Figure 1:
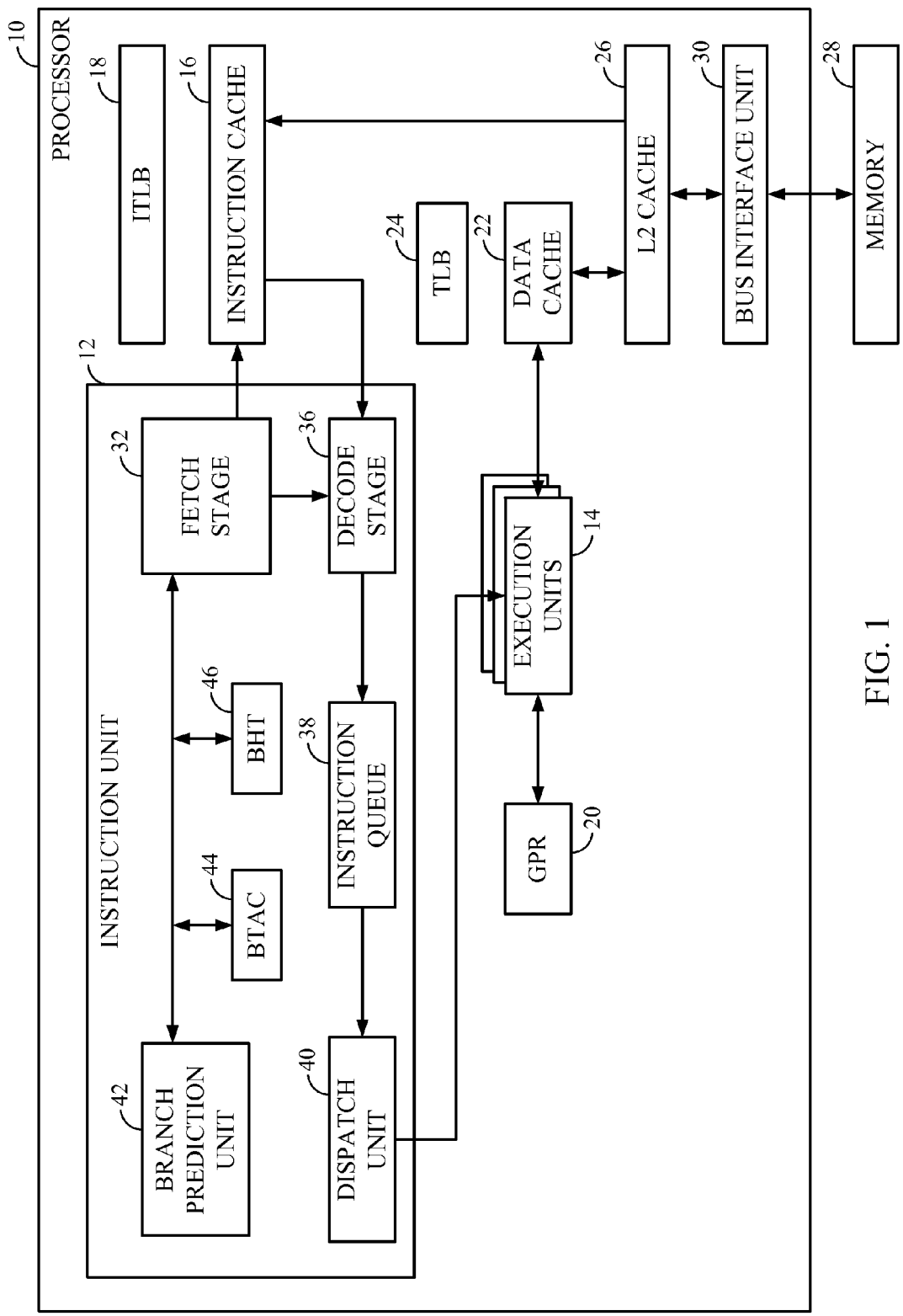
FIG. 1 is a functional block diagram of a processor.

FIG. 1 depicts a functional block diagram of a processor 10. The processor 10 includes an instruction unit 12 and one or more execution units 14. The instruction unit 12 provides centralized control of instruction flow to the execution units 14. The instruction unit 12 fetches instructions from an instruction cache 16, with memory address translation and permissions managed by an instruction-side Translation Lookaside Buffer (ITLB) 18.

The execution units 14 execute instructions dispatched by the instruction unit 12. The execution units 14 read and write General Purpose Registers (GPR) 20 and access data from a data cache 22, with memory address translation and permissions managed by a main Translation Lookaside Buffer (TLB) 24. In various embodiments, the ITLB 18 may comprise a copy of part of the TLB 24. Alternatively, the ITLB 18 and TLB 24 may be integrated. Similarly, in various embodiments of the processor 10, the instruction cache 16 and data cache 22 may be integrated, or unified. Misses in the instruction cache 16 and/or the data cache 22 cause an access to a second level, or L2 cache 26, depicted as a unified instruction and data cache 26 in FIG. 1, although other embodiments may include separate L2 caches. Misses in the L2 cache 26 cause an access to main (off-chip) memory 28, under the control of a memory interface 30.

The instruction unit 12 includes fetch 32 and decode 36 stages of the processor 10 pipeline. The fetch stage 32 performs instruction cache 16 accesses to retrieve instructions, which may include an L2 cache 26 and/or memory 28 access if the desired instructions are not resident in the instruction cache 16 or L2 cache 26, respectively. The decode stage 36 decodes retrieved instructions. The instruction unit 12 further includes an instruction queue 38 to store instructions decoded by the decode stage 36, and an instruction dispatch unit 40 to dispatch queued instructions to the appropriate execution units 14.

A branch prediction unit (BPU) 42 predicts the execution behavior of conditional branch instructions. Instruction addresses in the fetch stage 32 access a branch target address cache (BTAC) 44 and a branch history table (BHT) 46 in parallel with instruction fetches from the instruction cache 16. A hit in the BTAC 44 indicates a branch instruction that was previously evaluated taken, and the BTAC 44 provides the branch target address (BTA) of the branch instruction's last execution. The BHT 46 maintains branch prediction records corresponding to resolved branch instructions, the records indicating whether known branches have previously evaluated taken or not taken. The BHT 46 records may, for example, include saturation counters that provide weak to strong predictions that a branch will be taken or not taken, based on previous evaluations of the branch instruction. The BPU 42 assesses hit/miss information from the BTAC 44 and branch history information from the BHT 46 to formulate branch predictions. The BPU 42 may include additional circuits (not shown) to increase branch prediction accuracy, such as a global branch history register, tables or circuits that track the accuracy of previous branch predictions, and the like.

Figure 2:
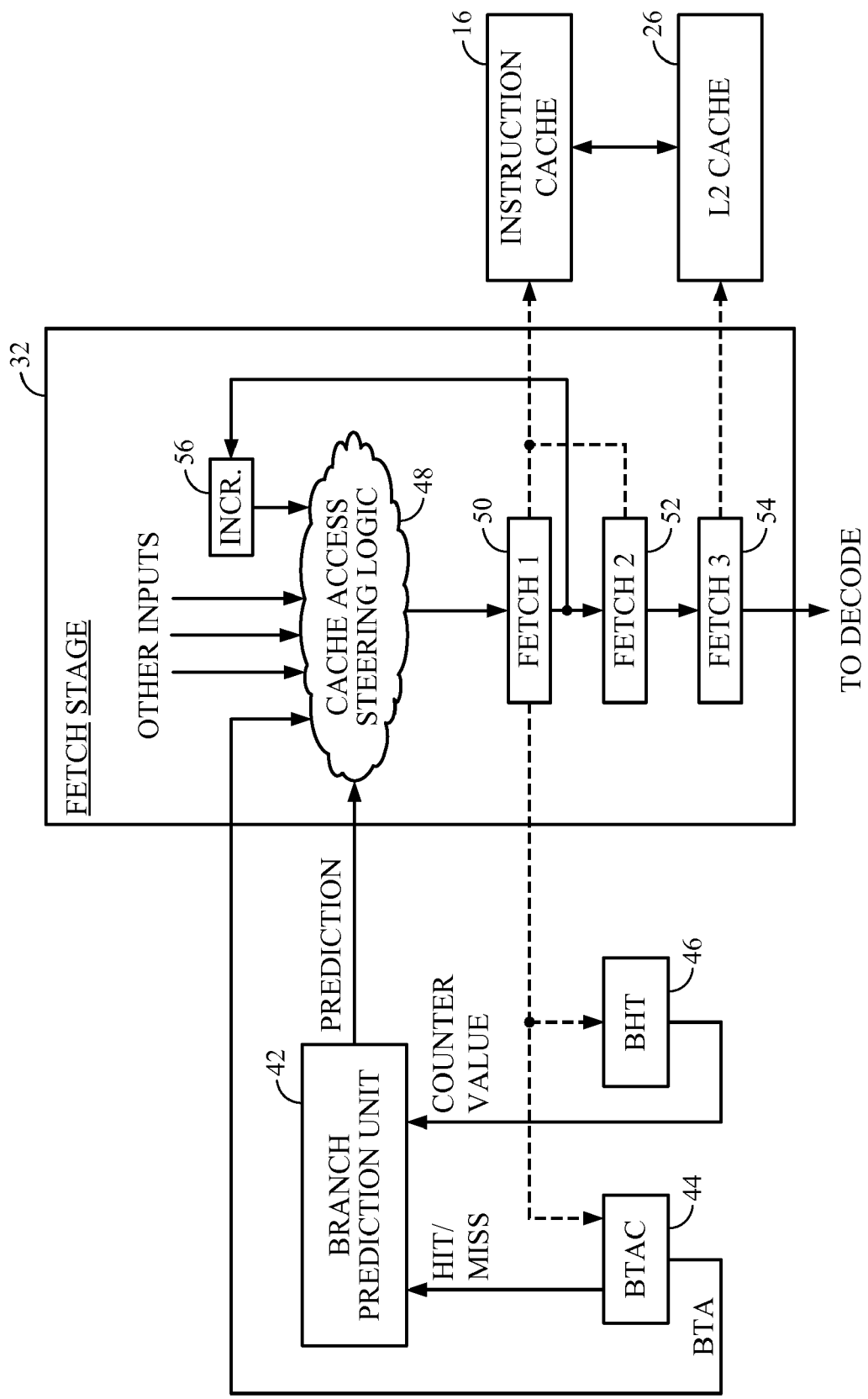
FIG. 2 is a functional block diagram of the fetch a stage of a processor.

FIG. 2 is a functional block diagram depicting the fetch stage 32 and branch prediction circuits of the instruction unit 12 in greater detail. Note that the dotted lines in FIG. 2 depict functional access relationships, not necessarily direct connections. The fetch stage 32 includes cache access steering logic 48 that selects instruction addresses from a variety of sources. One instruction address per cycle is launched into the instruction fetch pipeline comprising, in this embodiment, three stages: the FETCH1 stage 50, the FETCH2 stage 52, and the FETCH3 stage 54.

The cache access steering logic 48 selects instruction addresses to launch into the fetch pipeline from a variety of sources. One instruction address source is the output of an incrementor 56 operating on the output of the FETCH1 pipeline stage 50 to generate the next sequential instruction address (which may be associated with one instruction, or a block or fetch group comprising a plurality of instructions). Another instruction address source is the BTAC 44, providing the branch target address of the previous execution of a branch instruction, if the BPU 42 predicts the branch to evaluate taken. Other instruction address sources include exception handlers, interrupt vector addresses, and the like.

The FETCH1 stage 50 and FETCH2 stage 52 perform simultaneous, parallel, two-stage accesses to the instruction cache 16 and the BTAC 44, and simultaneously access the BHT 46 in the first cycle. In particular, an instruction address in the FETCH1 stage 50 accesses the instruction cache 16, BTAC 44, and BHT 46 during a first cache access cycle to ascertain whether instructions associated with the address are resident in the instruction cache 16 (via a hit or miss in the instruction cache 16); whether a known the branch instruction is associated with the instruction address (via a hit or miss in the BTAC 44); and to obtain a branch prediction (via the value of a counter in the BHT 46). In the following, second cache access cycle, the instruction address moves to the FETCH2 stage 52, and instructions are available from the instruction cache 16 and/or a branch target address (BTA) is available from the BTAC 44, if the instruction address hit in the respective cache 16, 44.

If the instruction address misses in the instruction cache 16, it proceeds to the FETCH3 stage 54 to launch an L2 cache 26 access. Those of skill in the art will readily recognize that the fetch pipeline may comprise more or fewer register stages than the embodiment depicted in FIG. 2, depending on e.g., the access timing of the instruction cache 16 and BTAC 44.

As used herein, the term "functional instruction address" refers to the bits of a byte memory address that are actually used to access instructions, disregarding unused bits on the least significant end. Functional instruction addresses are formed using different byte memory address bits for different instruction lengths. For example, 4096 16-bit instructions are addressed by byte memory address bits [12:1]. Bit 0 is not part of the functional instruction address for 16-bit instructions because no individual byte is addressed. Similarly, 4096 32-bit instructions are addressed by byte memory address bits [13:2]. Neither of the byte memory address bits [1:0] are part of the functional instruction address for 32-bit instructions because neither bytes nor halfwords are addressed.

Figure 3:
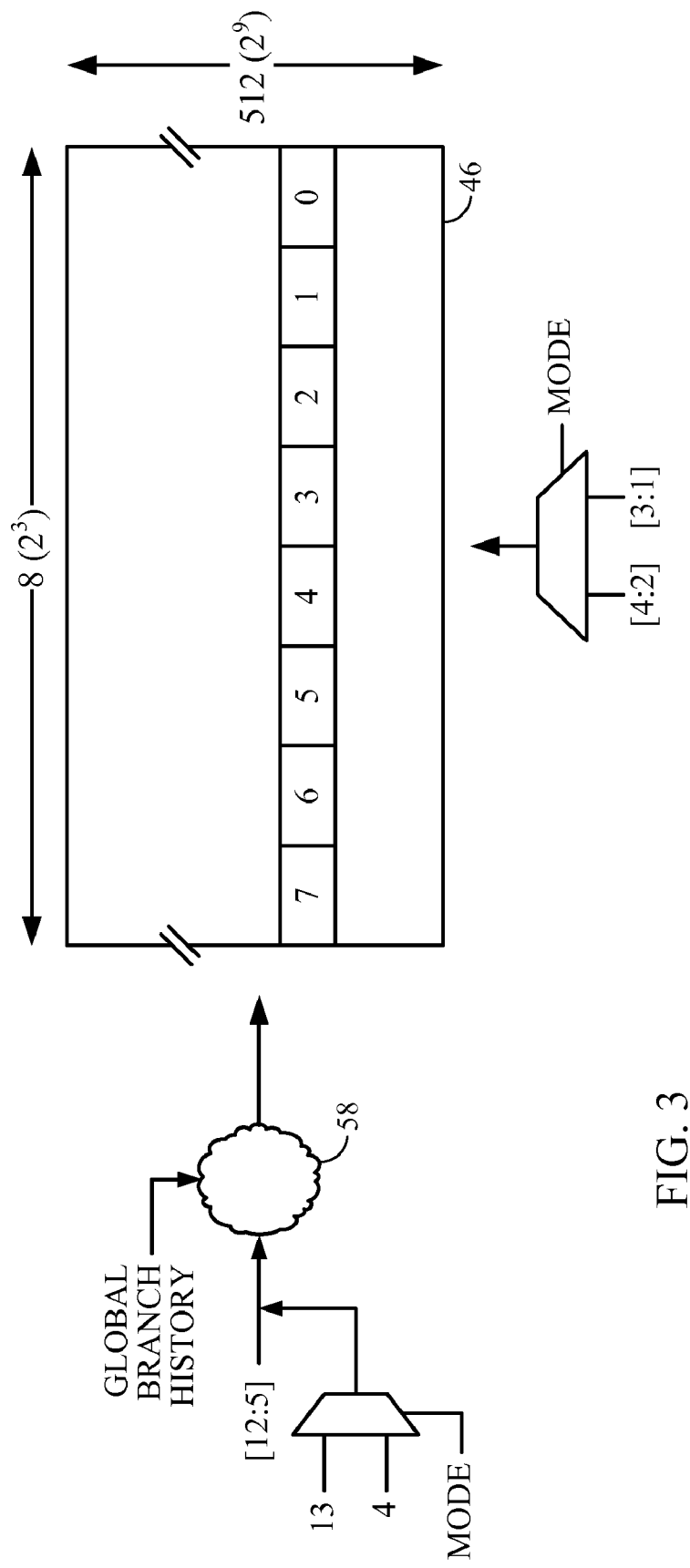
FIG. 3 is a functional block diagram of a BHT according to one embodiment.

A functional block diagram of one embodiment of a BHT 46 is depicted in FIG. 3. The BHT 46 includes 4096 2-bit counters, arranged as 512 lines, with 8 counters per line. Accordingly, a line index address comprises nine bits, and a counter index address comprises three bits. However, in different instruction set execution modes executing different minimum length instructions, the line and counter address bits will differ, corresponding to differences in the functional instruction addresses. In particular, a native line index address would comprise instruction address bits [13:5] in a 32-bit instruction set execution mode, and bits [12:4] in a 16-bit instruction set execution mode. Similarly, the native counter index address would comprise instruction address bits [4:2] in the 32-bit instruction set execution mode and bits [3:1] in the 16-bit instruction set execution mode.

As used herein, the term "native" line and counter index addresses for a given instruction set execution mode having a particular minimum instruction length refers to the instruction address bits that would be used to access the BHT 46 if all instructions were of that same length. In particular, the native counter index address comprises the least significant n functional instruction address bits required to uniquely index all $2^n$ counters per line. The native line index address comprises the next m more significant bits of the functional instruction address required to uniquely index all $2^m$ lines in the BHT 46.

Multiplexing between the native line and counter index addresses, using the instruction set execution mode as a selector, would require multiplexing all (m+n) bits (12 bits, in the embodiment of FIG. 3), resulting in unacceptable power consumption and access delay.

In the embodiment depicted in FIG. 3, a line index address is formed by taking the native line index address bits common to both the 32-bit and 16-bit instruction set execution modes—that is, bits [12:5]—and concatenating to these common bits, the bits exclusive to each respective native line index address when in the corresponding instruction set execution mode. That is, bit 13 (exclusive to the native line index address of the 32-bit instruction set execution mode) and bit 4 (exclusive to the native line index address of the 16-bit instruction set execution mode) are multiplexed together, based on the current instruction set execution mode, and concatenated to the common bits [12:5], to form a 9-bit line index address.

As depicted in FIG. 3, this 9-bit line index address may optionally be combined with global branch history information, such as by a hash function or other logic 58, prior to indexing lines of the BHT 46. In this embodiment, the full native counter index addresses are multiplexed, based on the current instruction set execution mode. In particular, bits [4:2] in the 32-bit instruction set execution mode, and bits [3:1] in the 16-bit instruction set execution mode, index the counters within each line. This requires multiplexing three bits in the counter index address and one bit in the line index address, for a total of four multiplexers for the BHT 46, as opposed to twelve, if the full native line and counter index address bits were multiplexed.

Figure 4:
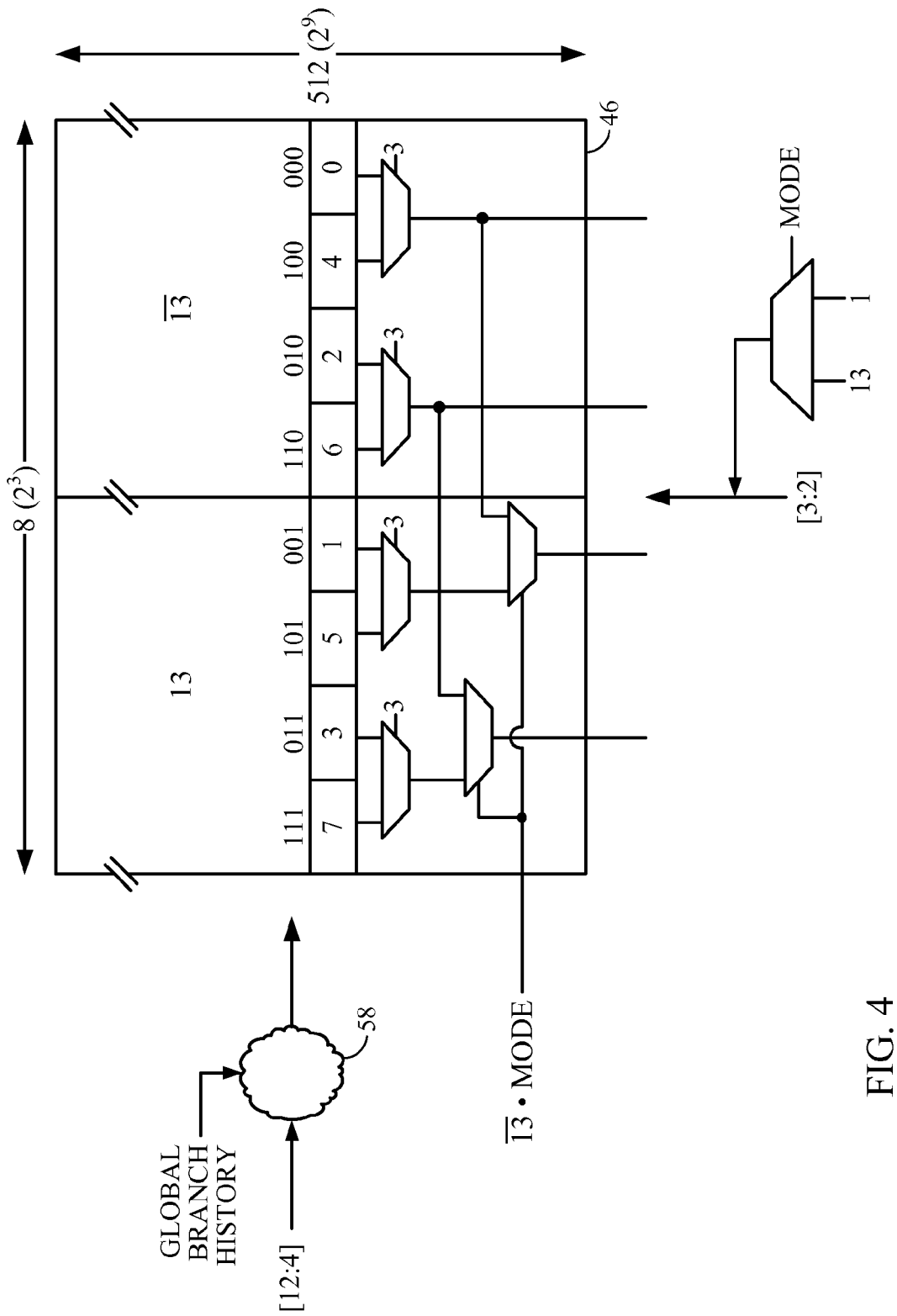
FIG. 4 is a functional block diagram of a BHT according to a different embodiment wherein only half of the BHT is powered during one processor instruction set execution mode.

FIG. 4 depicts another embodiment of a BHT 46, in which only a single-bit multiplexer is required to fully utilize every counter in the BHT 46 in both 32-bit and 16-bit instruction set execution modes. The line index address is the native line index address for the instruction set execution mode having the smaller minimum instruction length—in this case, the 16-bit instruction set execution mode—i.e., bits [12:4]. Here again, the line index address may be modified by a global branch history in logic 58. The counter index address is formed by taking the native counter index address bits common to both the 32-bit and 16-bit instruction set execution modes—that is, bits [3:2]—and concatenating to these common bits, the bits exclusive to each concatenated native line/counter index address. That is, bit 13 (exclusive to the native line index address of the 32-bit instruction set execution mode) and bit 1 (exclusive to the native counter index address of the 16-bit instruction set execution mode) are multiplexed together based on the current instruction set execution mode, and concatenated to the common bits [3:2], to form a 3-bit counter index address.

In addition, in the embodiment of FIG. 4, the BHT 46 is divided into two halves, each of which is powered separately. Furthermore, counters are arranged in each line such that the counters having an even counter index address (i.e., ending in 0) are in one half of the line, and the counters having an odd counter index address (i.e., ending in 1) are in the other half of the line. Since in the 32-bit instruction set execution mode, the least significant bit of the counter index address is bit 13, when in that mode, only half of the BHT 46 needs to be powered up—the active half of the BHT 46 is selected by bit 13. This represents a significant power savings when in the processor is operated in the 32-bit instruction set execution mode.

In the embodiment of the fetch stage 32 of the processor 10 depicted in FIG. 2, the FETCHn stage registers 50, 52, 54 each hold four halfwords (8 bytes). Thus, each FETCHn stage register 50, 52, 54 holds a maximum of two instructions in the 32-bit instruction set execution mode and a maximum of four instructions in the 16-bit instruction set execution mode. Accordingly, a BHT 46 access may retrieve up to two counter values in the 32-bit mode, and up to four counter values in the 16-bit mode. In no case are all eight counter values accessed in the same cycle.

In the BHT 46 embodiment of FIG. 4, the counters are further arranged in each line such that counter values that are mutually exclusive to a particular BHT 46 access—that is, counters that cannot both be simultaneously accessed—are directly adjacent. This allows the counter values to be multiplexed in the BHT 46, as depicted by the first row of output multiplexers in FIG. 4, reducing wiring congestion at the BHT 46 outputs. This constraint on arranging counters is achieved in the embodiment of FIG. 4 by juxtaposing counters whose counter index addresses differ only in their most significant bit. For example, counter index addresses 0x1 (001) and 0x5 (101), differing only at bit 3, are adjacent. The select input to each of the first level of output multiplexers is bit 3 of the associated instruction address.

In the 32-bit instruction set execution mode, a maximum of two counter values may be retrieved in a single BHT 46 access. The second level of multiplexers depicted in FIG. 4 steer the outputs of the even side of the BHT 46 to the odd side of the BHT 46. Here again, this reduces wiring congestion at the BHT 46 output and simplifies retrieval of the counter values in the 32-bit instruction set execution mode.

Although the present invention has been described herein with respect to 32-bit and 16-bit instruction set execution modes, the invention is not limited to this implementation, and may be advantageously applied to any variable length instruction set processor. In addition, the particular arrangement and multiplexing of counter values may be altered by those of skill in the art to optimize the invention for any particular implementation. In general, although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of operating a branch history table (BHT) comprising a plurality of counters in a variable length instruction set processor to execute instructions in at least a first instruction set execution mode having a first minimum instruction length and a second instruction set execution mode having a smaller, second minimum instruction length, the method comprising:
    powering both a first half of the BHT and a second half of the BHT during BHT accesses in the second instruction set execution mode; and
    powering only the first half of the BHT or only the second half of the BHT during any given BHT access in the first instruction set execution mode.

2. The method of claim 1, further comprising assigning the plurality of counters to a plurality of lines, wherein each line comprises a first half and a second half, wherein each of the plurality of counters is associated with a counter index address, wherein counters associated with an even counter index address are assigned to the first half of the lines, and wherein counters associated with an odd counter index address are assigned to the second half of the lines.

3. The method of claim 2, wherein a first counter and a second counter are assigned to a half of a particular line, wherein the first counter and the second counter cannot be simultaneously accessed, and wherein the first counter is adjacent to the second counter.

4. The method of claim 3, wherein the counter index address associated with the first counter and the counter index address associated with the second counter differ by one bit.

5. The method of claim 1, wherein the first minimum instruction length is thirty-two bits and wherein the second minimum instruction length is sixteen bits.

6. The method of claim 1, wherein powering one of the first half of the BHT and the second half of the BHT during the BHT access in the first instruction set execution mode is based on a value of a most significant native line index address bit exclusive to the first instruction set execution mode.

7. A processor, comprising:
    an instruction execution pipeline having a fetch stage and operative to execute instructions in at least a first instruction set execution mode corresponding to instructions having a first minimum instruction length and a second instruction set execution mode corresponding to instructions having a smaller, second minimum instruction length; and
    a branch history table (BHT) comprising a first half and a second half, wherein a plurality of counters are arranged and indexed based on instruction addresses corresponding to the fetch stage, and wherein one of the first half of the BHT and the second half of the BHT is powered during any given BHT access during execution of instructions in the first instruction set mode.

8. The processor of claim 7, wherein the plurality of counters are assigned to a plurality of lines, wherein each line comprises a first half and a second half, wherein each of the plurality of counters is associated with a counter index address, and wherein counters associated with an even counter index address are assigned to the first half of the lines, and wherein counters associated with an odd counter index address are assigned to the second half of the lines.

9. The processor of claim 8, wherein each half of a particular line includes at least a first counter and a second counter, wherein the first counter and the second counter cannot be simultaneously accessed, and wherein the first counter is adjacent to the second counter.

10. The method of claim 9, wherein the counter index address associated with the first counter and the counter index address associated with the second counter differ by one bit.

11. The method of claim 7, wherein the first minimum instruction length is thirty-two bits and wherein the second minimum instruction length is sixteen bits.

12. The method of claim 7, wherein powering one of the first half of the BHT and the second half of the BHT during execution of instructions in the first instruction set execution mode is based on a value of a most significant native line index address bit exclusive to the first instruction set execution mode.

13. The method of claim 7, further comprising powering the first half of the BHT and the second half of the BHT during execution of instructions in the second instruction set execution mode.

14. A method comprising:
dividing a branch history table (BHT) into a first half and a second half, wherein the BHT includes a plurality of counters associated with a variable length instruction set processor configured to execute instructions in at least a first instruction set execution mode corresponding to instructions having a first minimum instruction length and a second instruction set execution mode corresponding to instructions having a second minimum instruction length that is different from the first minimum instruction length; and
powering one of the first half of the BHT and the second half of the BHT during a BHT access when executing instructions in the first instruction set execution mode.

15. The method of claim 14, further comprising powering the first half of the BHT and the second half of the BHT when executing instructions in the second instruction execution mode.

16. The method of claim 14, further comprising assigning the plurality of counters to a plurality of lines, wherein each line comprises a first half and a second half, wherein each of the plurality of counters is associated with a counter index address, and wherein counters associated with an even counter index address are assigned to the first half of the lines, and wherein counters associated with an odd counter index address are assigned to the second half of the lines.

17. The method of claim 16, wherein each half of a particular line includes at least a first counter and a second counter, wherein the first counter and the second counter cannot be simultaneously accessed, and wherein the first counter is adjacent to the second counter.

18. The method of claim 17, wherein the counter index address associated with the first counter and the counter index address associated with the second counter differ by one bit.

19. The method of claim 14, wherein powering one of the first half of the BHT and the second half of the BHT in the first instruction set execution mode is based on a value of a most significant native line index address bit exclusive to the first instruction set execution mode.

20. The method of claim 14, wherein the first minimum instruction length is thirty-two bits and wherein the second minimum instruction length is sixteen bits.

21. An apparatus comprising:
means for executing instructions in a variable length instruction set processor in at least a first instruction set execution mode having a first minimum instruction length and a second instruction set execution mode having a smaller, second minimum instruction length;
means for powering both a first half of a branch history table (BHT) and a second half of the BHT during BHT accesses in the second instruction set execution mode, wherein the BHT comprises a plurality of counters; and
means for powering only the first half of the BHT or only the second half of the BHT during any given BHT access in the first instruction set execution mode.

22. The apparatus of claim 21, further comprising means for assigning a plurality of counters to a plurality of lines, wherein each line comprises a first half and a second half, wherein each of the plurality of counters is associated with a counter index address, wherein counters associated with an even counter index address are assigned to the first half of the lines, and wherein counters associated with an odd counter index address are assigned to the second half of the lines.

23. The apparatus of claim 22, wherein a first counter and a second counter are assigned to a half of a particular line, wherein the first counter and the second counter cannot be simultaneously accessed, and wherein the first counter is adjacent to the second counter.

24. The apparatus of claim 23, wherein the counter index address associated with the first counter and the counter index address associated with the second counter differ by one bit.

25. The apparatus of claim 21, wherein the first minimum instruction length is thirty-two bits and wherein the second minimum instruction length is sixteen bits.

26. The apparatus of claim 21, wherein the means for powering only the first half of the BHT or only the second half of the BHT includes means for powering one of the first half of the BHT and the second half of the BHT during the BHT access in the first instruction set execution mode is based on a value of a most significant native line index address bit exclusive to the first instruction set execution mode.

27. An apparatus comprising:
means for executing instructions in at least a first instruction set execution mode corresponding to instructions having a first minimum instruction length and a second instruction set execution mode corresponding to instructions having a smaller, second minimum instruction length, wherein the means for executing instructions includes an instruction execution pipeline having a fetch stage; and
means for storing branch history data, the means for storing including a first half and a second half; and
means for counting that includes counters arranged and indexed based on instruction addresses corresponding to the fetch stage, wherein one of the first half of the means for storing and the second half of the means for storing is powered during any given access to the means for storing that occurs during execution of instructions in the first instruction set mode.

28. The apparatus of claim 27, wherein the counters are assigned to a plurality of lines, wherein each line comprises a first half and a second half, wherein each counter of the means for counting is associated with a counter index address, and wherein counters associated with an even counter index address are assigned to the first half of the lines, and wherein counters associated with an odd counter index address are assigned to the second half of the lines.

29. The apparatus of claim 28, wherein each half of a particular line includes at least a first counter and a second counter, wherein the first counter and the second counter cannot be simultaneously accessed, and wherein the first counter is adjacent to the second counter.

30. The apparatus of claim 29, wherein the counter index address associated with the first counter and the counter index address associated with the second counter differ by one bit.

31. The apparatus of claim 27, wherein the first minimum instruction length is thirty-two bits and wherein the second minimum instruction length is sixteen bits.

32. The apparatus of claim 27, wherein powering one of the first half of the means for storing and the second half of the means for storing during execution of instructions in the first instruction set execution mode is based on a value of a most significant native line index address bit exclusive to the first instruction set execution mode.

33. The apparatus of claim 27, further comprising powering the first half of the means for storing and the second half of the means for storing during execution of instructions in the second instruction set execution mode.

34. An apparatus comprising:
means for dividing a branch history table (BHT) into a first half and a second half, wherein the BHT includes a plurality of counters associated with a variable length instruction set processor, wherein the variable length instruction set processor is configured to execute instructions in at least a first instruction set execution mode corresponding to instructions having a first minimum instruction length and a second instruction set execution mode corresponding to instructions having a second minimum instruction length that is different from the first minimum instruction length; and means for powering one of the first half of the BHT and the second half of the BHT during a BHT access when executing instructions in the first instruction set execution mode.

35. The apparatus of claim 34, further comprising means for powering the first half of the BHT and the second half of the BHT when executing instructions in the second instruction execution mode.

36. The apparatus of claim 34, further comprising means for assigning the plurality of counters to a plurality of lines, wherein each line comprises a first half and a second half, wherein each of the plurality of counters is associated with a counter index address, and wherein counters associated with an even counter index address are assigned to the first half of the lines, and wherein counters associated with an odd counter index address are assigned to the second half of the lines.

37. The apparatus of claim 36, wherein each half of a particular line includes at least a first counter and a second counter, wherein the first counter and the second counter cannot be simultaneously accessed, and wherein the first counter is adjacent to the second counter.

38. The apparatus of claim 37, wherein the counter index address associated with the first counter and the counter index address associated with the second counter differ by one bit.

39. The apparatus of claim 34, wherein the means for powering provides power to one of the first half of the BHT and the second half of the BHT in the first instruction set execution mode based on a value of a most significant native line index address bit exclusive to the first instruction set execution mode.

40. The apparatus of claim 34, wherein the first minimum instruction length is thirty-two bits and wherein the second minimum instruction length is sixteen bits.

41. A non-transitory computer-readable storage medium comprising instructions that, when executed by a processor, cause the processor to:

power only a first half of a branch history table (BHT) or only a second half of the BHT during any given BHT access in a first instruction set execution mode; and power both the first half of the branch history table (BHT) and the second half of the BHT during BHT accesses in a second instruction set execution mode, wherein the BHT comprises a plurality of counters;

wherein a variable length instruction set processor is configured to execute instructions in at least the first instruction set execution mode and the second instruction set execution mode, wherein the first instruction set execution mode has a first minimum instruction length, and wherein the second instruction set execution mode has a smaller, second minimum instruction length.

42. The non-transitory computer-readable storage medium of claim 41, further comprising instructions executable by the processor to assign the plurality of counters to a plurality of lines, wherein each line comprises a first half and a second half, wherein each of the plurality of counters is associated with a counter index address, wherein counters associated with an even counter index address are assigned to the first half of the lines, and wherein counters associated with an odd counter index address are assigned to the second half of the lines.

43. The non-transitory computer-readable storage medium of claim 42, wherein a first counter and a second counter are assigned to a half of a particular line, wherein the first counter and the second counter cannot be simultaneously accessed, and wherein the first counter is adjacent to the second counter.

44. The non-transitory computer-readable storage medium of claim 43, wherein the counter index address associated with the first counter and the counter index address associated with the second counter differ by one bit.

45. The non-transitory computer-readable storage medium of claim 41, wherein the first minimum instruction length is thirty-two bits and wherein the second minimum instruction length is sixteen bits.

46. The non-transitory computer-readable storage medium of claim 41, wherein powering one of the first half of the BHT and the second half of the BHT during the BHT access in the first instruction set execution mode is based on a value of a most significant native line index address bit exclusive to the first instruction set execution mode.

47. A non-transitory computer-readable storage medium comprising instructions that, when executed by a processor, cause the processor to:

operate an instruction execution pipeline having a fetch stage in at least a first instruction set execution mode corresponding to instructions having a first minimum instruction length and a second instruction set execution mode corresponding to instructions having a smaller, second minimum instruction length; and arrange and index a plurality of counters in a branch history table (BHT) based on instruction addresses corresponding to the fetch stage, wherein the BHT comprises a first half and a second half, and wherein one of the first half of the BHT and the second half of the BHT is powered during any given BHT access during execution of instructions in the first instruction set mode.

48. The non-transitory computer-readable storage medium of claim 47, wherein the plurality of counters are assigned to a plurality of lines, wherein each line comprises a first half and a second half, wherein each of the plurality of counters is associated with a counter index address, and wherein counters associated with an even counter index address are assigned to the first half of the lines, and wherein counters associated with an odd counter index address are assigned to the second half of the lines.

49. The non-transitory computer-readable storage medium of claim 48, wherein each half of a particular line includes at least a first counter and a second counter, wherein the first counter and the second counter cannot be simultaneously accessed, and wherein the first counter is adjacent to the second counter.

50. The non-transitory computer-readable storage medium of claim 49, wherein the counter index address associated with the first counter and the counter index address associated with the second counter differ by one bit.

51. The non-transitory computer-readable storage medium of claim 47, wherein the first minimum instruction length is thirty-two bits and wherein the second minimum instruction length is sixteen bits.

52. The non-transitory computer-readable storage medium of claim 47, wherein powering one of the first half of the BHT and the second half of the BHT during execution of instructions in the first instruction set execution mode is based on a value of a most significant native line index address bit exclusive to the first instruction set execution mode.

53. The non-transitory computer-readable storage medium of claim 47, further comprising instructions executable by the processor to power the first half of the BHT and the second half of the BHT during execution of instructions in the second instruction set execution mode.

54. A non-transitory computer-readable storage medium comprising instructions that, when executed by a processor, cause the processor to:
divide a branch history table (BHT) into a first half and a second half, wherein the BHT includes a plurality of counters associated with a variable length instruction set processor configured to execute instructions in at least a first instruction set execution mode corresponding to instructions having a first minimum instruction length and a second instruction set execution mode corresponding to instructions having a second minimum instruction length that is different from the first minimum instruction length; and
power one of the first half of the BHT and the second half of the BHT during a BHT access when executing instructions in the first instruction set execution mode.

55. The non-transitory computer-readable storage medium of claim 54, further comprising instructions executable by the processor to power the first half of the BHT and the second half of the BHT when executing instructions in the second instruction execution mode.

56. The non-transitory computer-readable storage medium of claim 54, further comprising instructions executable by the processor to assign the plurality of counters to a plurality of lines, wherein each line comprises a first half and a second half, wherein each of the plurality of counters is associated with a counter index address, and wherein counters associated with an even counter index address are assigned to the first half of the lines, and wherein counters associated with an odd counter index address are assigned to the second half of the lines.

57. The non-transitory computer-readable storage medium of claim 56, wherein each half of a particular line includes at least a first counter and a second counter, wherein the first counter and the second counter cannot be simultaneously accessed, and wherein the first counter is adjacent to the second counter.

58. The non-transitory computer-readable storage medium of claim 57, wherein the counter index address associated with the first counter and the counter index address associated with the second counter differ by one bit.

59. The non-transitory computer-readable storage medium of claim 54, wherein powering one of the first half of the BHT and the second half of the BHT in the first instruction set execution mode is based on a value of a most significant native line index address bit exclusive to the first instruction set execution mode.

60. The non-transitory computer-readable storage medium of claim 54, wherein the first minimum instruction length is thirty-two bits and wherein the second minimum instruction length is sixteen bits.

* * * * *